US009811084B2

(12) United States Patent
Srivastava et al.

(10) Patent No.: US 9,811,084 B2
(45) Date of Patent: *Nov. 7, 2017

(54) IDENTIFYING UNMANNED AERIAL VEHICLES FOR MISSION PERFORMANCE

(71) Applicant: Verizon Patent and Licensing Inc., Arlington, VA (US)

(72) Inventors: Ashok N. Srivastava, Mountain View, CA (US); Douglas M. Pasko, Bridgewater, NJ (US); Hani Batla, Teaneck, NJ (US); Igor Kantor, Raleigh, NC (US); Gurpreet Ubhi, Nutley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/441,764

(22) Filed: Feb. 24, 2017

(65) Prior Publication Data

US 2017/0160740 A1 Jun. 8, 2017

Related U.S. Application Data

(63) Continuation of application No. 14/282,179, filed on May 20, 2014, now Pat. No. 9,583,006.

(51) Int. Cl.
| | |
|---|---|
| *G05D 1/00* | (2006.01) |
| *B64C 39/02* | (2006.01) |
| *G08G 5/00* | (2006.01) |
| *G07C 5/00* | (2006.01) |
| *G06Q 10/04* | (2012.01) |

(52) U.S. Cl.
CPC ......... *G05D 1/0027* (2013.01); *B64C 39/024* (2013.01); *G07C 5/008* (2013.01); *G08G 5/0034* (2013.01); *G08G 5/0069* (2013.01); *G06Q 10/047* (2013.01)

(58) Field of Classification Search
None
See application file for complete search history.

(56) References Cited

U.S. PATENT DOCUMENTS

| | | |
|---|---|---|
| 8,639,396 B1 | 1/2014 | Hirsch et al. |
| 8,643,719 B2 | 2/2014 | Vian et al. |

(Continued)

OTHER PUBLICATIONS

Alighanbari, et al., "Filter-Embedded UAV Task Assignment Algorithms for Dynamic Environments", AIAA Guidance, Navigation, and Control Conference and Exhibit, Aug. 16-19, 2004, 15 pages.

(Continued)

*Primary Examiner* — Redhwan k Mawari
*Assistant Examiner* — Edward Torchinsky

(57) ABSTRACT

A device receives a request for a mission that includes traversal of a flight path from a first location to a second location and performance of mission operations, and calculates the flight path from the first location to the second location based on the request. The device determines required capabilities for the mission based on the request, and identifies UAVs based on the required capabilities for the mission. The device generates flight path instructions for the flight path and mission instructions for the mission operations, and provides the flight path/mission instructions to the identified UAVs to permit the identified UAVs to travel from the first location to the second location, via the flight path, and to perform the mission operations at the second location.

20 Claims, 11 Drawing Sheets

(56) References Cited

U.S. PATENT DOCUMENTS

| | | | |
|---|---|---|---|
| 2007/0021880 A1 | 1/2007 | Appleby et al. |
| 2009/0219393 A1 | 9/2009 | Vian et al. |
| 2010/0312388 A1 | 12/2010 | Jang et al. |
| 2014/0025228 A1 | 1/2014 | Jang et al. |
| 2014/0166817 A1 | 6/2014 | Levien et al. |

OTHER PUBLICATIONS

Bertuccelli, et al., "Robust Planning for Coupled Cooperative UAV Missions", 43rd IEEE Conference on Decision and Control, vol. 3, IEEE, 2004, 8 pages.

Boyd, et al., "Convex Optimization", Cambridge University Press, 2004, 730 pages.

Choi, et al., "Information delivery scheme of micro UAVs having limited communication range during tracking the moving target", The Journal of Supercomputing, vol. 66, Issue 2, 2013, pp. 950-972.

How, et al., "Flight Demonstrations of Cooperative Control for UAV Teams", AIAA 3rd "Unmanned Unlimited" Technical Conference, Workshop and Exhibit, Sep. 20-23, 2004, 9 pages.

How, et al., "Multi-vehicle Experimental Platform for Distributed Coordination and Control", http://www.mit.edu/people/ihow/durip1.html, Apr. 1, 2004, 4 pages.

Kuwata, et al., "Three Dimensional Receding Horizon Control for UAVs", AIAA Guidance, Navigation, and Control conference and Exhibit, Aug. 16-19, 2004, 14 pages.

Park, et al., "Agent Technology for Coordinating UAV Target Tracking", Knowledge-Based Intelligent Information and Engineering Systems, Springer Berlin Heidelberg, 2005, 8 pages.

Redding, et al., "Distributed Multi-Agent Persistent Surveillance and Tracking with Health Management", American Institute Aeronautics and Astronautics, AIAA Guidance, Navigation, and Control Conference, 2011, pp. 1-18.

Richards, et al., "Decentralized Model Predictive Control of Cooperating UAVs", 43rd IEEE Conference on Decision and Control, vol. 4, IEEE, 2004, 6 pages.

Richards, et al., "Model Predictive Control of Vehicle Maneuvers with Guaranteed Completion Time and Robust Feasibility", American Control Conference, 2003, Proceedings of the 2003, vol. 5, IEEE, 2003, 7 p.p.

Saad, et al., "Vehicle Swarm Rapid Prototyping Testbed", American Institute of Aeronautics and Astronautics, Aerospace Conference and AIAA Unmanned . . . Unlimited Conference, 2009, 9 pages.

Tin, "Robust Multi-UAV Planning in Dynamic and Uncertain Environments", Massachusetts Institute of Technology, 2004, 110 pages.

Toksoz, et al., "Automated Battery Swap and Recharge to Enable Persistent UAV Missions", AIAA Infotech@ Aerospace Conference, 2011, 10 pages.

Wikipedia, "Waze", https://en.wikipedia.org/wiki/Waze, Mar. 30, 2014, 6 pages.

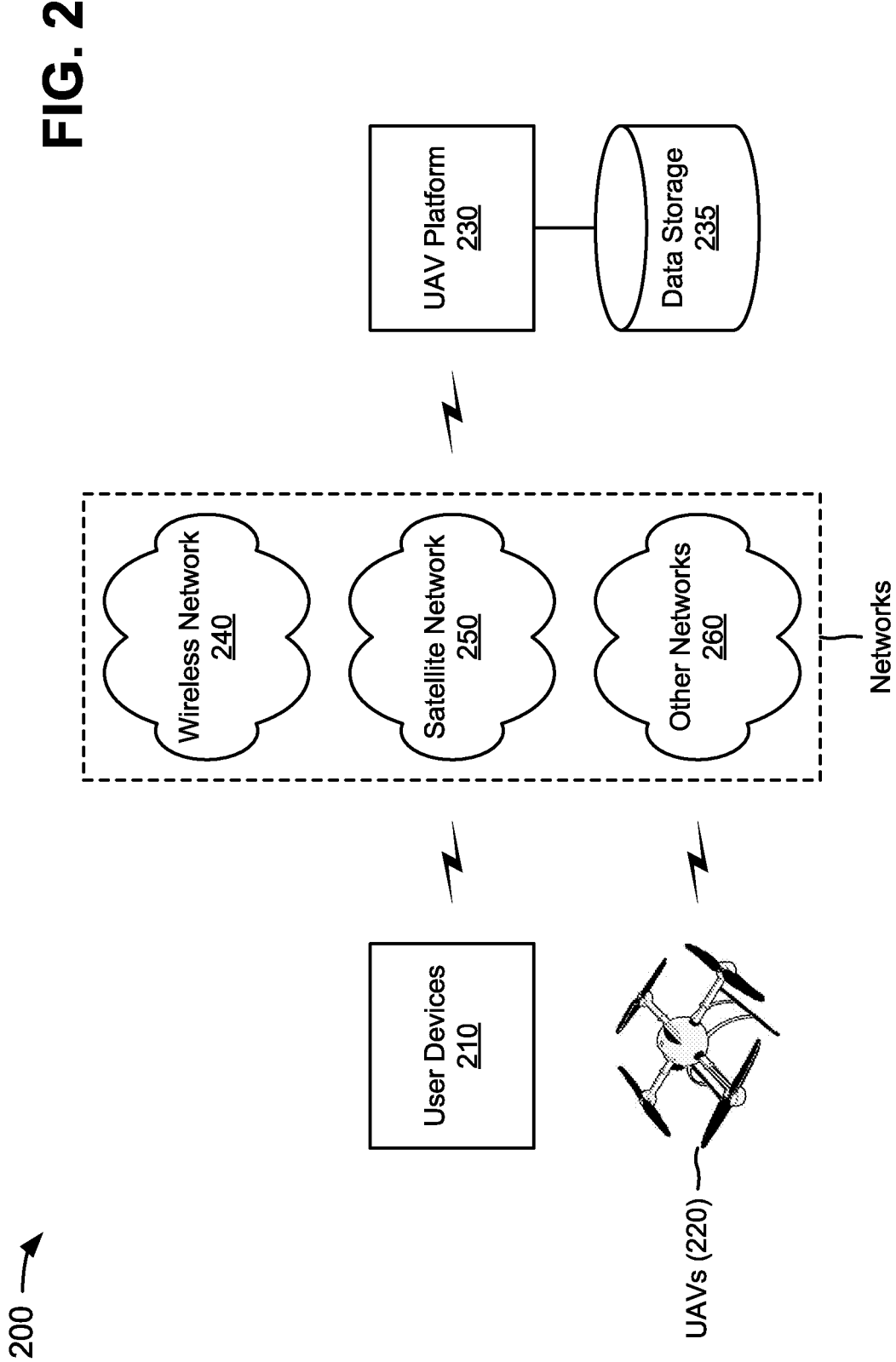

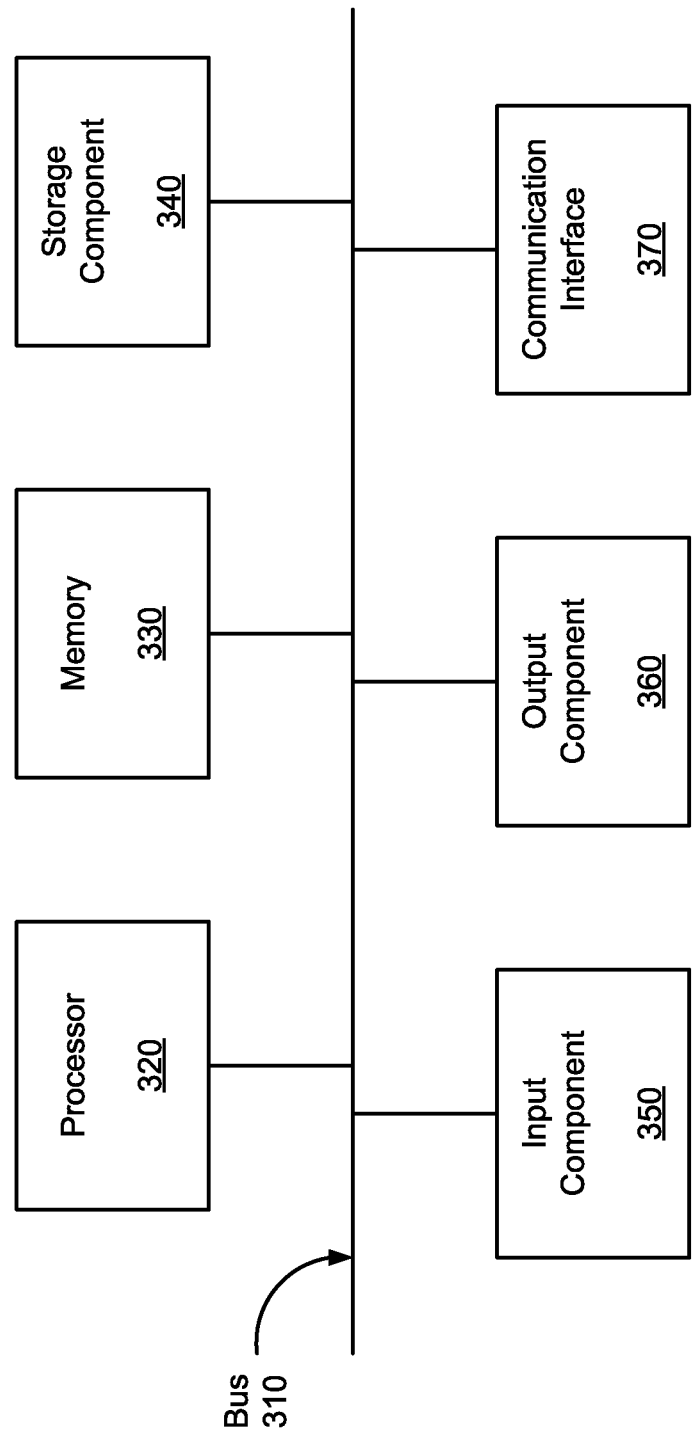

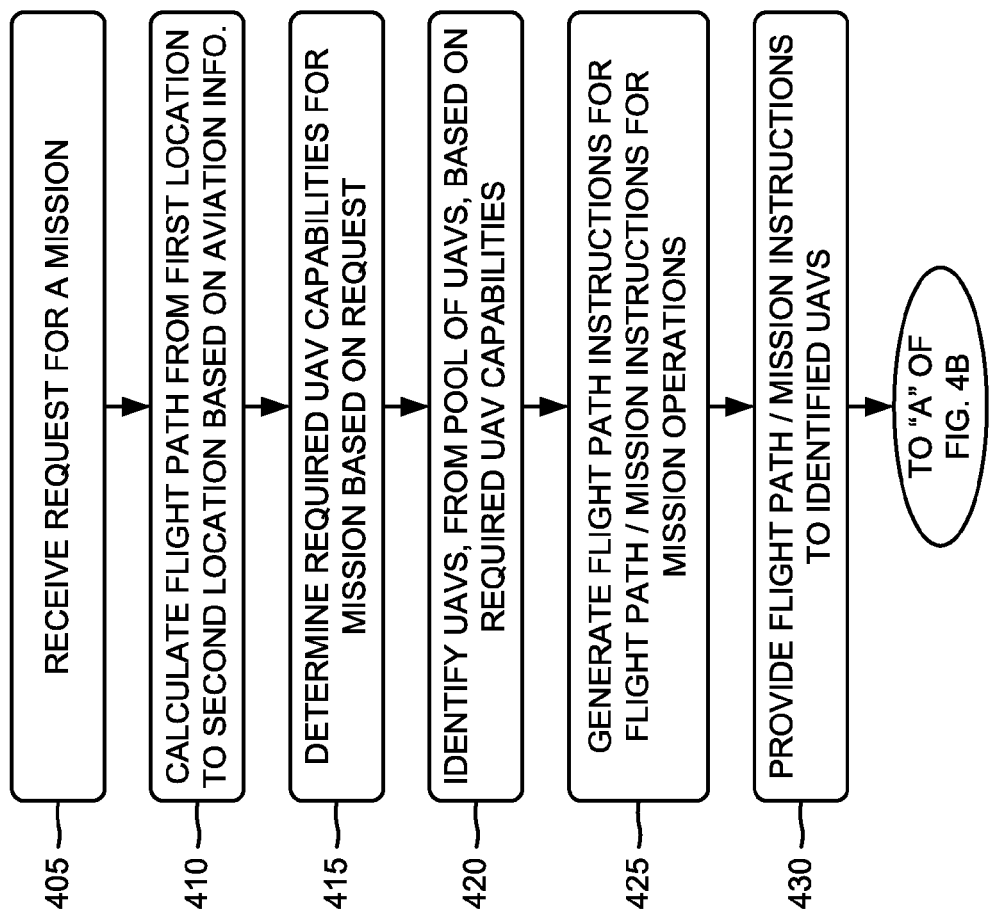

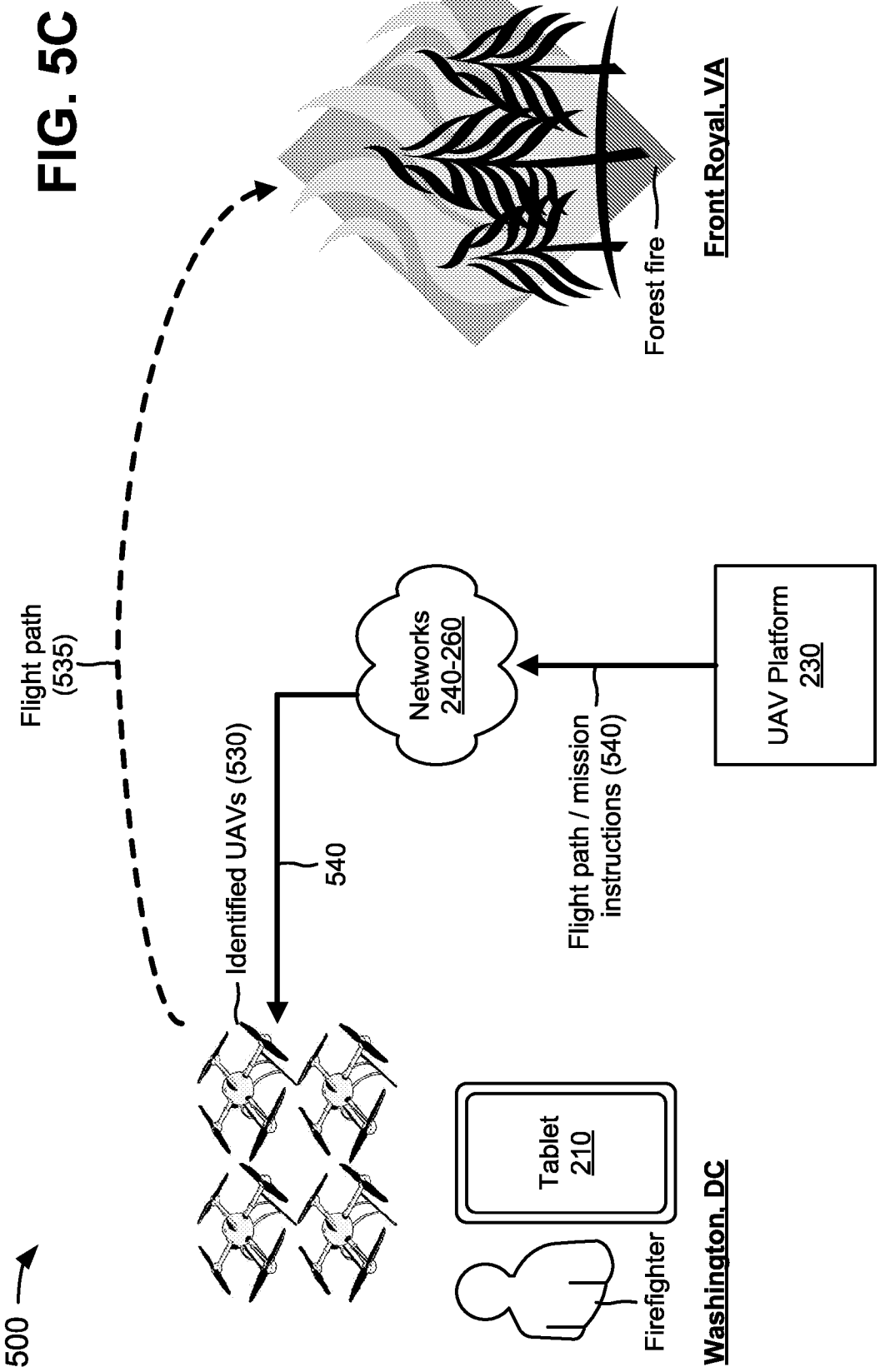

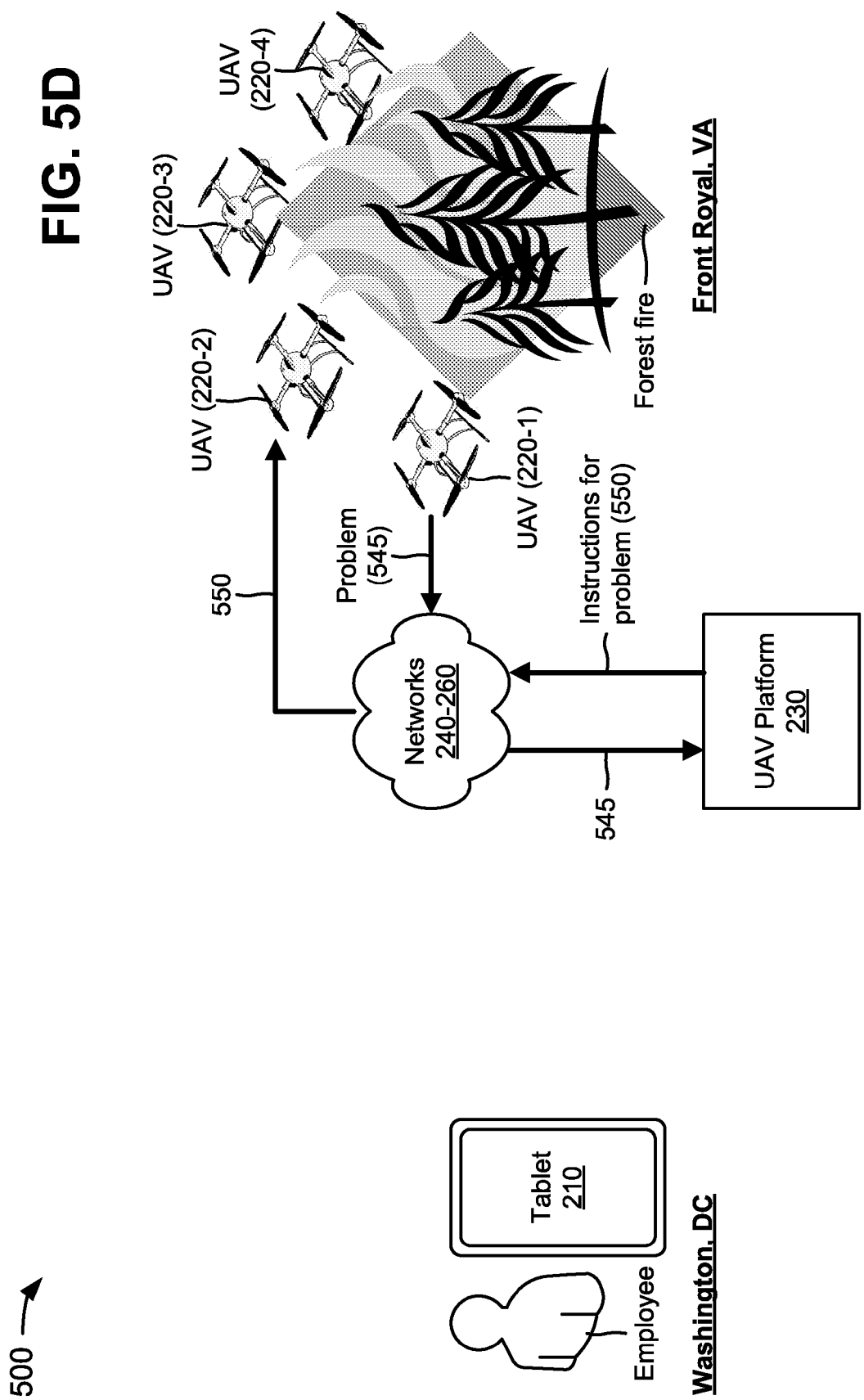

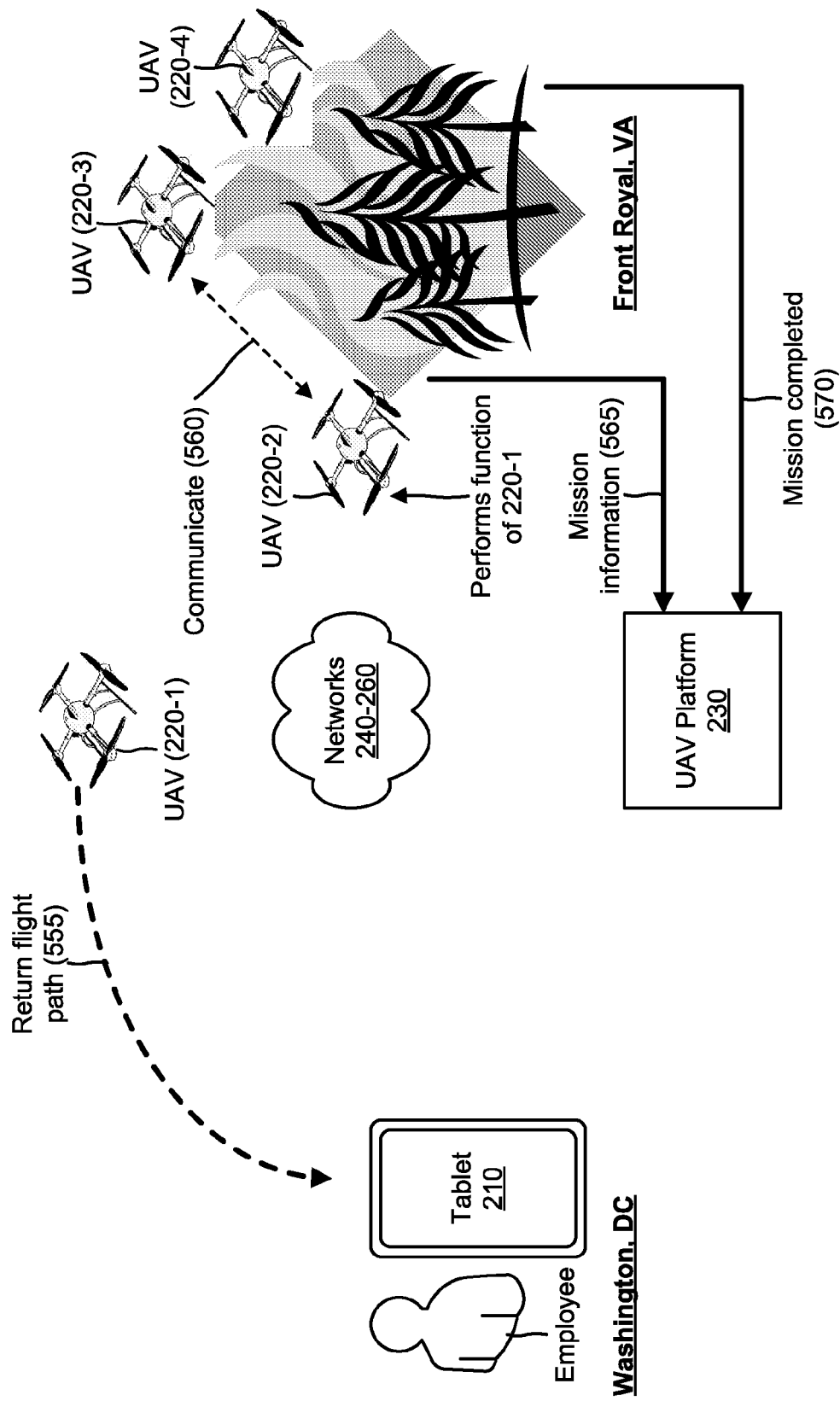

IDENTIFYING UNMANNED AERIAL VEHICLES FOR MISSION PERFORMANCE

BACKGROUND

An unmanned aerial vehicle (UAV) is an aircraft without a human pilot aboard. A UAV's flight may be controlled either autonomously by onboard computers or by remote control of a pilot on the ground or in another vehicle. A UAV is typically launched and recovered via an automatic system or an external operator on the ground. There are a wide variety of UAV shapes, sizes, configurations, characteristics, etc. UAVs may be used for a growing number of civilian applications, such as police surveillance, firefighting, security work (e.g., surveillance of pipelines), surveillance of farms, commercial purposes, etc.

BRIEF DESCRIPTION OF THE DRAWINGS

FIG. 2 is a diagram of an example environment in which systems and/or methods described herein may be implemented;

FIG. 3 is a diagram of example components of one or more devices of FIG. 2;

FIGS. 4A and 4B depict a flow chart of an example process for identifying and instructing UAVs to perform a mission via a flight path; and FIGS. 5A-5E are diagrams of an example relating to the example process shown in FIGS. 4A and 4B.

DETAILED DESCRIPTION OF PREFERRED EMBODIMENTS

The following detailed description refers to the accompanying drawings. The same reference numbers in different drawings may identify the same or similar elements.

Some private companies propose using UAVs for rapid delivery of lightweight commercial products (e.g., packages), food, medicine, etc. Such proposals for UAVs may need to meet various requirements, such as federal and state regulatory approval, public safety, reliability, individual privacy, operator training and certification, security (e.g., hacking), payload thievery, logistical challenges, etc.

Figure 1A:
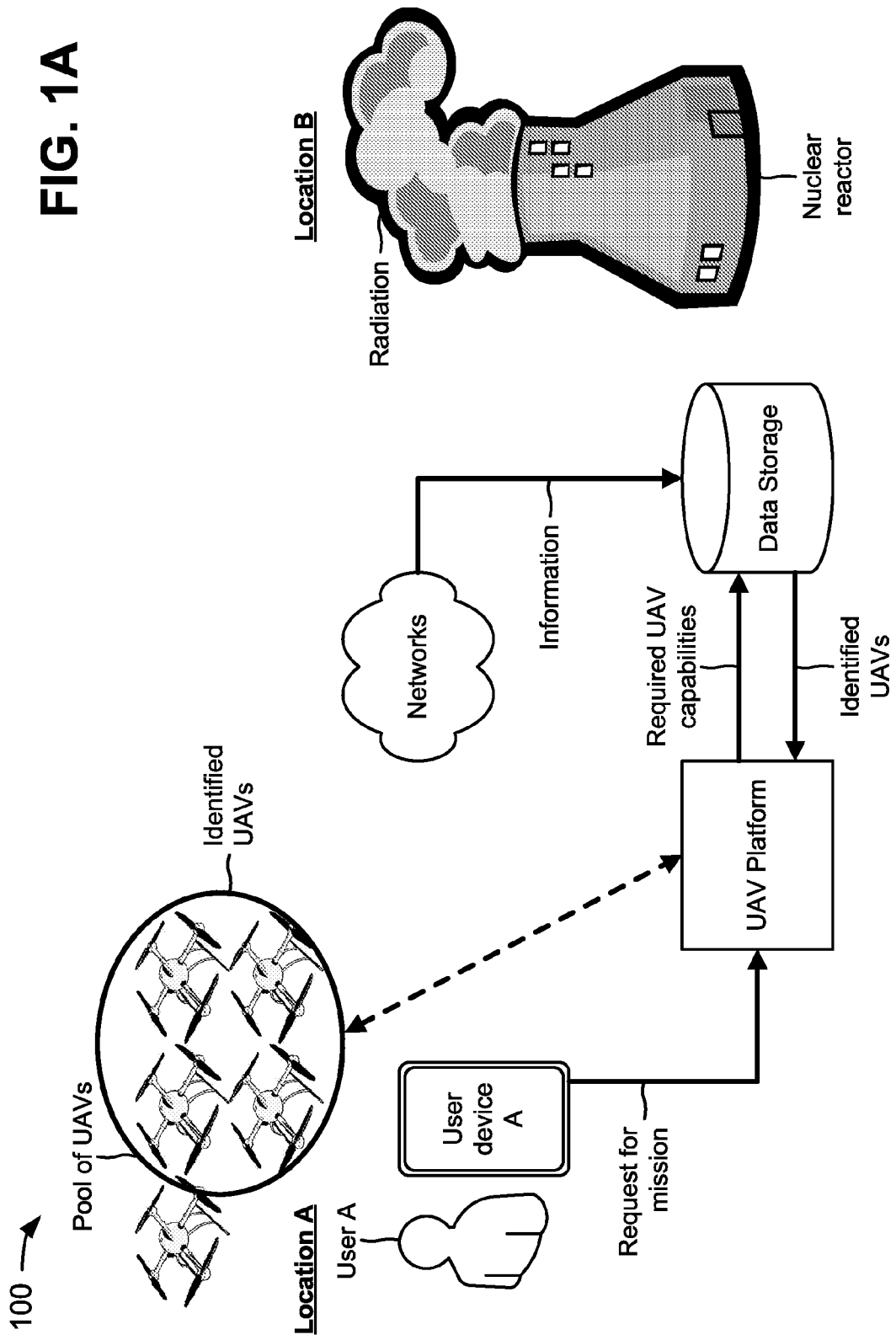
FIGS. 1A and 1B are diagrams of an overview of an example implementation described herein.
Figure 1B:
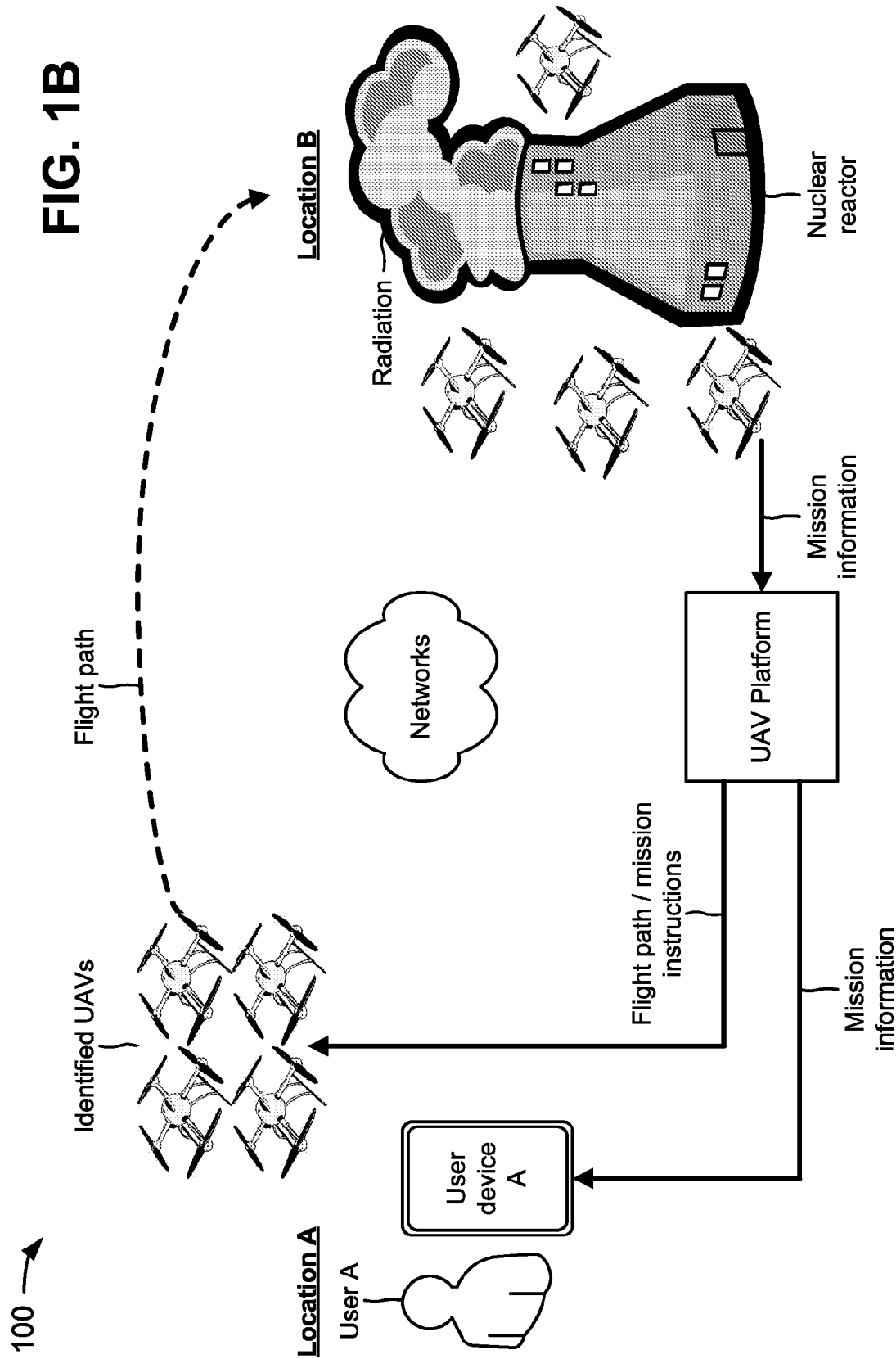

FIGS. 1A and 1B are diagrams of an overview of an example implementation 100 described herein. In example implementation 100, assume that a user device (e.g., user device A) is associated with a user (e.g., user A) that is located at an origination location (e.g., location A), as shown in FIG. 1A. Further, assume that user A wants to fly multiple UAVs, selected from a pool or group of UAVs, from location A to a destination location (e.g., location B) in order to perform a mission at location B. For example, user A may want the multiple UAVs to perform surveillance and take measurements of a nuclear reactor (e.g., at location B) that is emitting dangerous levels of radiation. As further shown in FIG. 1A, a UAV platform or system may be associated with data storage, and the UAV platform and the data storage may communicate with networks, such as a wireless network, a satellite network, and/or other networks. The networks may provide information to the data storage, such as capability information associated with the UAVs (e.g., thrusts, battery life, etc. associated with the UAVs); weather information associated with a geographical region that includes geographical locations of location A, location B, and locations between location A and location B; air traffic information associated with the geographical region; obstacle information (e.g., buildings, mountains, etc.) associated with the geographical region; regulatory information (e.g., no-fly zones, government buildings, etc.) associated with the geographical region; historical information (e.g., former flight paths, former weather, etc.) associated with the geographical region; etc.

As further shown in FIG. 1A, user A may instruct user device A to generate a request for a mission for multiple UAVs in the pool of UAVs, and to provide the request to the UAV platform. The request may include credentials (e.g., serial numbers, identifiers of universal integrated circuit cards (UICCs), etc.) associated with the UAVs in the pool. The UAV platform may utilize the UAV credentials to determine whether the UAVs in the pool are authenticated for utilizing the UAV platform and/or one or more of the networks, and are registered with an appropriate authority (e.g., a government agency) for use. For example, the UAV platform may compare the UAV credentials with UAV account information (e.g., information associated with authenticated and registered UAVs) provided in the data storage to determine whether the UAVs in the pool are authenticated. In example implementation 100, assume that the UAVs in the pool are authenticated by the UAV platform. The request may also include mission information for the multiple UAVs, such as capturing video and/or images of the nuclear reactor, measuring radiation levels at different locations near the nuclear reactor, measuring temperature levels at the different locations, etc.

The UAV platform may calculate a flight path from location A to location B based on aviation information (e.g., the weather information, the air traffic information, etc. of the geographical region). As further shown in FIG. 1A, the UAV platform may determine required UAV capabilities for the mission based on the request for the mission, and may store the required UAV capabilities in the data storage. For example, the UAV platform may determine that the mission requires a first UAV to capture video of the nuclear reactor, a second UAV to capture images of the nuclear reactor, a third UAV to detect temperature levels around the nuclear reactor, and a fourth UAV to detect radiation levels around the nuclear reactor. Prior to receiving the request for the mission, the UAV platform may determine different capability information associated with each UAV in the pool of UAVs, such as, for example, components available to each UAV (e.g., a video camera, a temperature sensor, a radiation sensor, etc.); component information of each UAV (e.g., identifiers (e.g., serial numbers, model numbers, etc.) of the components, information identifying a particular type of battery, engine, rotors, etc. of each UAV, etc.); a current state of each UAV (e.g., available, fully charged, unavailable, charging battery, etc.); etc.

As further shown in FIG. 1A, the UAV platform may identify multiple UAVs, from the UAVs in the pool, based on the required UAV capabilities for the mission. For example, as shown in FIG. 1A, the UAV platform may identify four UAVs from the pool of UAVs based on the required UAV capabilities for the mission. A first UAV of the identified UAVs may be capable of capturing video of the nuclear reactor, a second UAV of the identified UAVs may be capable of capturing images of the nuclear reactor, a third UAV of the identified UAVs may be capable of detecting temperature levels around the nuclear reactor, and a fourth UAV of the identified UAVs may be capable of detecting radiation levels around the nuclear reactor.

After identifying the UAVs in the pool of UAVs, the UAV platform may generate flight path instructions and/or mission instructions for the mission, as shown in FIG. 1B. For example, the flight path instructions may indicate that the identified UAVs are to fly at an altitude of two-thousand (2,000) meters, for fifty (50) kilometers and fifty-five (55) minutes, in order to arrive at location B. The mission instructions may indicate, for example, that the first UAV of the identified UAVs is to capture video of the nuclear reactor, the second UAV of the identified UAVs is to capture images of the nuclear reactor, the third UAV of the identified UAVs is to detect temperature levels around the nuclear reactor, and the fourth UAV of the identified UAVs is to detect radiation levels around the nuclear reactor. The UAV platform may provide the flight path instructions and the mission instructions to the identified UAVs (e.g., via one or more of the networks), as further shown in FIG. 1B.

The identified UAVs may take off from location A, and may travel the flight path, based on the flight path instructions, until the identified UAVs arrive at location B. When the identified UAVs arrive at location B, the identified UAVs may perform the mission operations based on the mission instructions. For example, the first UAV of the identified UAVs may capture video of the nuclear reactor, the second UAV of the identified UAVs may capture images of the nuclear reactor, the third UAV of the identified UAVs may detect temperature levels around the nuclear reactor, and the fourth UAV of the identified UAVs may detect radiation levels around the nuclear reactor. The video, the images, the temperature levels, and the radiation levels of the nuclear reactor may be provided by the identified UAVs to the UAV platform (e.g., as mission information). As further shown in FIG. 1B, the UAV platform may provide the mission information to user device A (e.g., for display to user A). Once the identified UAVs complete the mission, the identified UAVs may return to location A or to another location (e.g., for decontamination from the radiation).

Systems and/or methods described herein may provide a platform that enables UAVs to safely traverse flight paths from origination locations to destination locations. The systems and/or methods may enable UAVs to perform missions that may be too dangerous for humans to perform. The systems and/or methods may enable selection of UAVs most capable of collecting different types of information for a mission, which may increase efficiencies of the UAVs and reduce costs associated with utilizing the UAVs.

FIG. 2 is a diagram of an example environment 200 in which systems and/or methods described herein may be implemented. As illustrated, environment 200 may include user devices 210, UAVs 220, a UAV platform 230, data storage 235, a wireless network 240, a satellite network 250, and other networks 260. Devices/networks of environment 200 may interconnect via wired connections, wireless connections, or a combination of wired and wireless connections.

User device 210 may include a device that is capable of communicating over wireless network 240 with UAV 220, UAV platform 230, and/or data storage 235. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a global positioning system (GPS) device; a gaming device; or another type of computation and communication device.

UAV 220 may include an aircraft without a human pilot aboard, and may also be referred to as an unmanned aircraft (UA), a drone, a remotely piloted vehicle (RPV), a remotely piloted aircraft (RPA), or a remotely operated aircraft (ROA). In some implementations, UAV 220 may include a variety of shapes, sizes, configurations, characteristics, etc. for a variety of purposes and applications. In some implementations, UAV 220 may include one or more sensors, such as electromagnetic spectrum sensors (e.g., visual spectrum, infrared, or near infrared cameras, radar systems, etc.); biological sensors; chemical sensors; etc. In some implementations, UAV 220 may utilize one or more of the aforementioned sensors to sense (or detect) and avoid an obstacle in or near a flight path of UAV 220.

In some implementations, UAV 220 may include a particular degree of autonomy based on computational resources provided in UAV 220. For example, UAV 220 may include a low degree of autonomy when UAV 220 has few computational resources. In another example, UAV 220 may include a high degree of autonomy when UAV 220 has more computational resources (e.g., built-in control and/or guidance systems to perform low-level human pilot duties, such as speed and flight-path stabilization, scripted navigation functions, waypoint following, etc.). The computational resources of UAV 220 may combine information from different sensors to detect obstacles on the ground or in the air; communicate with one or more of networks 240-260 and/or other UAVs 220; determine an optimal flight path for UAV 220 based on constraints, such as obstacles or fuel requirements; determine an optimal control maneuver in order to follow a given path or go from one location to another location; regulate a trajectory of UAV 220; etc. In some implementations, UAV 220 may include a variety of components, such as a power source (e.g., an internal combustion engine, an electric battery, a solar-powered battery, etc.); a component that generates aerodynamic lift force (e.g., a rotor, a propeller, a rocket engine, a jet engine, etc.); computational resources; sensors; etc.

UAV platform 230 may include one or more personal computers, one or more workstation computers, one or more server devices, one or more virtual machines (VMs) provided in a cloud computing network, or one or more other types of computation and communication devices. In some implementations, UAV platform 230 may be associated with a service provider that manages and/or operates wireless network 240, satellite network 250, and/or other networks 260, such as, for example, a telecommunication service provider, a television service provider, an Internet service provider, etc.

In some implementations, UAV platform 230 may receive, from user device 210, a request for a mission that includes travelling along a flight path from an origination location to a destination location and performing one or more mission operations at the destination location. UAV platform 230 may calculate the flight path from the origination location to the destination location based on aviation information (e.g., weather information, air traffic information, etc.), and may determine required UAV capabilities for the mission based on the request for the mission. UAV platform 230 may identify UAVs 220, from a pool of UAVs 220, based on the required UAV capabilities for the mission. After identifying the identified UAVs 220, UAV platform 230 may generate flight path instructions and mission instructions, and may provide the flight path instructions and the mission instructions to the identified UAVs 220. UAV platform 230 may receive mission information from the identified UAVs 220, when the identified UAVs 220 are performing the mission operations at the destination location. UAV platform 230 may determine whether any problems are occurring with the mission based on the mission information, and may identify a problem with a particular UAV 220 of the identified UAVs 220. UAV platform 230 may instruct one of the other identified UAVs 220 to perform operation(s) associated with the particular UAV 220 in order to address the problem with the particular UAV 220. UAV platform 230 may receive, from the identified UAVs 220, a notification indicating that the mission has been completed by the identified UAVs 220.

In some implementations, UAV platform 230 may authenticate one or more users, associated with user device 210 and/or UAV 220, for utilizing UAV platform 230, and may securely store authentication information associated with the one or more users. In some implementations, UAV platform 230 may adhere to requirements to ensure that UAVs 220 safely traverse flight paths, and may limit the flight paths of UAVs 220 to particular safe zones (e.g., particular altitudes, particular geographical locations, particular geo-fencing, etc.) to further ensure safety.

Data storage 235 may include one or more storage devices that store information in one or more data structures, such as databases, tables, lists, trees, etc. In some implementations, data storage 235 may store information, such as UAV account information (e.g., serial numbers, model numbers, user names, etc. associated with UAVs 220); capability information associated with UAVs 220 (e.g., thrust, battery life, etc. associated with UAVs 220); weather information associated with a geographical region (e.g., precipitation amounts, wind conditions, etc.); air traffic information associated with the geographical region (e.g., commercial air traffic, other UAVs 220, etc.); obstacle information (e.g., buildings, mountains, towers etc.) associated with the geographical region; regulatory information (e.g., no-fly zones, government buildings, etc.) associated with the geographical region; historical information (e.g., former flight paths, former weather conditions, etc.) associated with the geographical region; etc. In some implementations, data storage 235 may be included within UAV platform 230.

Wireless network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN), and may include one or more base stations (e.g., cell towers). The EPC network may include an all-Internet protocol (IP) packet-switched core network that supports high-speed wireless and wireline broadband access technologies. The EPC network may allow user devices 210 and/or UAVs 220 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching. In some implementations, wireless network 240 may provide location information (e.g., latitude and longitude coordinates) associated with user devices 210 and/or UAVs 220. For example, wireless network 240 may determine a location of user device 210 and/or UAV 220 based on triangulation of signals, generated by user device 210 and/or UAV 220 and received by multiple cell towers, with prior knowledge of the cell tower locations.

Satellite network 250 may include a space-based satellite navigation system (e.g., a global positioning system (GPS)) that provides location and/or time information in all weather conditions, anywhere on or near the Earth where there is an unobstructed line of sight to four or more satellites (e.g., GPS satellites). In some implementations, satellite network 250 may provide location information (e.g., GPS coordinates) associated with user devices 210 and/or UAVs 220, enable communication with user devices 210 and/or UAVs 220, etc.

Each of other networks 260 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4B:
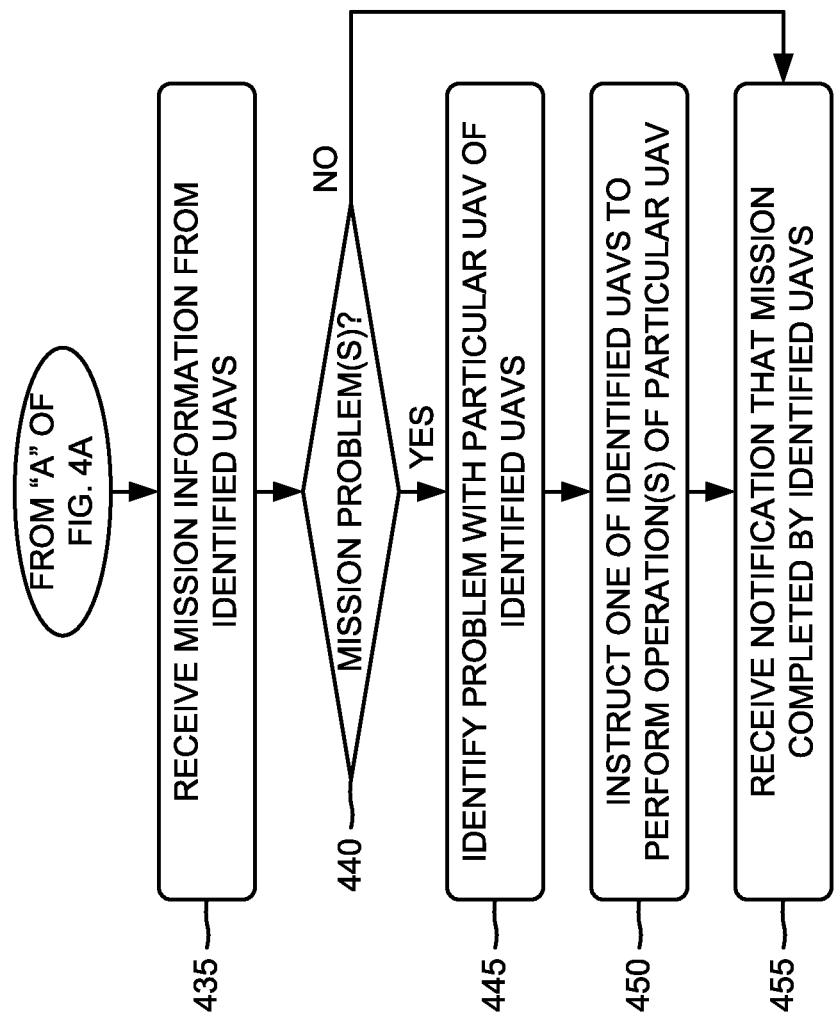

FIGS. 4A and 4B depict a flow chart of an example process 400 for identifying and instructing UAVs to perform a flight path and a mission. In some implementations, one or more process blocks of FIGS. 4A and 4B may be performed by UAV platform 230. In some implementations, one or more process blocks of FIGS. 4A and 4B may be performed by another device or a group of devices separate from or including UAV platform 230, such as user device 210 and/or UAV 220.

As shown in FIG. 4A, process 400 may include receiving a request for mission that includes travelling along a flight path from a first location to a second location and performing one or more mission operations at the second location (block 405). For example, UAV platform 230 may receive, from user device 210, a request for a mission that includes travelling a flight path from a first location to a second location in a particular region. In some implementations, the request for the mission may include a request for flight path instructions from an origination location (e.g., a current location of a pool of UAVs 220) to a destination location (e.g., a location in the particular region). The origination location and the destination location may be provided in the particular region. In some implementations, the pool of UAVs 220 may be associated with UAV platform 230 and/or user(s) associated with user device 210. For example, user device 210 and the pool of UAVs 220 may be owned and/or operated by an emergency service provider (e.g., a fire station, a police station, a hazardous materials handler, etc.), a delivery company, a telecommunication service provider, a television service provider, an Internet service provider, etc.

In some implementations, the request for the mission may include information requesting performance of one or more mission operations at the destination location. For example, the mission operations may include monitoring a nuclear reactor that is experiencing a meltdown and is leaking radiation. Such a request may include information requesting UAVs 220 to capture video of the nuclear reactor, capture images of the nuclear reactor, detect temperature levels at the nuclear reactor, detect radiation levels at the nuclear reactor, etc. In another example, the mission operations may include monitoring a forest fire. Such a request may include information requesting UAVs 220 to capture video of the forest fire, capture images of the forest fire, detect temperatures at different locations of the forest fire, detect wind conditions at the forest fire, etc. In some implementations, the mission operations may include monitoring a hostile location (e.g., a hostage location of a terrorist compound, a plane hijacking, etc.); a location of an accident (e.g., a building fire, a warehouse explosion, etc.); a location of a natural disaster (e.g., a tornado, a hurricane, a tsunami, an earthquake, etc.); etc.

As further shown in FIG. 4A, process 400 may include calculating the flight path from the first location to the second location based on aviation information (block 410). For example, UAV platform 230 may calculate the flight path from the origination location to the destination location based on aviation information. In some implementations, UAV platform 230 may calculate the flight path from the origination location to the destination location based on aviation information associated with the particular region, such as the weather information, the air traffic information, the obstacle information, the regulatory information, the historical information, etc. stored in UAV platform 230 and/or data storage 235. In some implementations, UAV platform 230 may determine whether the aviation information indicates that UAVs 220 in the pool may safely complete the flight path from the origination location to the destination location without stopping. If UAV platform 230 determines that UAVs 220 in the pool cannot safely complete the flight path from the origination location to the destination location without stopping (e.g., to recharge or refuel), UAV platform 230 may determine one or more waypoints along the flight path for stopping and recharging or refueling.

In some implementations, UAV platform 230 may calculate the flight path based on the weather information. For example, UAV platform 230 may determine that, without weather issues, the flight path may take any UAV 220 two hours to complete at an altitude of five-hundred meters. UAV platform 230 may further determine that wind conditions at five-hundred meters may create a headwind of fifty kilometers per hour on any UAV 220, but that wind conditions at one-thousand meters may create a tailwind of fifty kilometers per hour on any UAV 220. In such an example, UAV platform 230 may alter the flight path from an altitude of five-hundred meters to an altitude of one-thousand meters (e.g., if any UAV 220 is capable of reaching the altitude of one-thousand meters). Assume that the tailwind at the altitude of one-thousand meters decreases the flight time from two hours to one hour and thirty minutes. Alternatively, UAV platform 230 may not alter the flight path, but the headwind at the altitude of five-hundred meters may increase the flight time from two hours to two hours and thirty minutes.

Additionally, or alternatively, UAV platform 230 may calculate the flight path based on the air traffic information. For example, UAV platform 230 may determine that, without air traffic issues, the flight path may take any UAV 220 two hours to complete at an altitude of five-hundred meters. UAV platform 230 may further determine that other UAVs 220 are flying at the altitude of five-hundred meters based on the air traffic information, but that no other UAVs 220 are flying at an altitude of one-thousand meters. In such an example, UAV platform 230 may alter the flight path from an altitude of five-hundred meters to an altitude of one-thousand meters. The altitude of one-thousand meters may enable any UAV 220 to safely arrive at the location without the possibility of colliding with the other UAVs 220. Alternatively, UAV platform 230 may not alter the flight path, but the other UAVs 220 flying at the altitude of five-hundred meters may increase the possibility that any UAV 220 may collide with another UAV 220. UAV platform 230 may then determine whether any UAV 220 is capable of safely flying at the altitude of five-hundred meters without colliding with another UAV 220.

Additionally, or alternatively, UAV platform 230 may calculate the flight path based on the obstacle information. For example, UAV platform 230 may determine that, without obstacle issues, the flight path may take any UAV 220 one hour to complete at an altitude of two-hundred meters. UAV platform 230 may further determine that one or more buildings are two-hundred meters in height based on the obstacle information, but that no other obstacles are greater than two-hundred meters in height. In such an example, UAV platform 230 may alter the flight path from an altitude of two-hundred meters to an altitude of three-hundred meters. The altitude of three-hundred meters may enable any UAV 220 to safely arrive at the location without the possibility of colliding with the one or more buildings. Alternatively, UAV platform 230 may not alter the altitude of the flight path, but may change the flight path to avoid the one or more buildings, which may increase the flight time from one hour to one hour and thirty minutes.

Additionally, or alternatively, UAV platform 230 may calculate the flight path based on the regulatory information. For example, UAV platform 230 may determine that, without regulatory issues, the flight path may take any UAV 220 one hour to complete at an altitude of five-hundred meters. UAV platform 230 may further determine that the flight path travels over a restricted facility based on the regulatory information. In such an example, UAV platform 230 may change the flight path to avoid flying over the restricted facility, which may increase the flight time from one hour to one hour and thirty minutes.

Additionally, or alternatively, UAV platform 230 may calculate the flight path based on the historical information. For example, UAV platform 230 may identify prior flight paths from the origination location to the destination location from the historical information, and may select one of the prior flight paths, as the flight path. For example, assume that UAV platform 230 identifies three prior flight paths that include flight times of two hours, three hours, and four hours, respectively. In such an example, UAV platform 230 may select, as the flight path, the prior flight path with the flight time of two hours.

As further shown in FIG. 4A, process 400 may include determining required UAV capabilities for the mission based on the request for the mission (block 415). For example, UAV platform 230 may determine required UAV capabilities for traversing the flight path and performing the mission operations, based on the request for the mission. In some implementations, UAV platform 230 may determine the required UAV capabilities based on the origination location, the destination location, and/or the particular region associated with the flight path and/or the mission operations. For example, UAV platform 230 may determine that the flight path and/or the mission operations require UAVs 220 to be available and located at or near the origination location, able to travel non-stop to the destination location (e.g., located twenty kilometers from the origination location), able to travel in the particular region, etc. In such an example, UAV platform 230 may determine that UAVs 220 capable of flying ten kilometers non-stop do not satisfy the required UAV capabilities (e.g., since the destination location is located twenty kilometers from the origination location), but that UAVs 220 capable of flying thirty kilometers non-stop satisfies the required UAV capabilities.

In some implementations, UAV platform 230 may determine the required UAV capabilities based on physical requirements (e.g., payload capacity, battery life, non-stop flying distance, etc. associated with UAVs 220) associated with the flight path and/or the mission operations. For example, UAV platform 230 may determine that the flight path and/or the mission operations require UAVs 220 that are capable of carrying a payload that weighs ten kilograms for a distance of twenty kilometers non-stop. In such an example, UAV platform 230 may determine that UAVs 220 capable of carrying payloads that weigh less than five kilograms for a distance of ten kilometers non-stop do not satisfy the required UAV capabilities. However, UAV platform 230 may determine that UAVs 220 capable of carrying payloads that weigh twenty kilograms for a distance of thirty kilometers non-stop satisfy the required UAV capabilities.

In some implementations, UAV platform 230 may determine the required UAV capabilities based on component requirements (e.g., sensors, network generating components, etc. of UAVs 220) associated with the flight path and/or the mission operations. For example, UAV platform 230 may determine that the flight path and/or the mission operations require UAVs 220 that are capable of recording video images. In such an example, UAV platform 230 may determine that UAVs 220 without a video camera do not satisfy the required UAV capabilities, but that UAVs 220 with a video camera satisfy the required UAV capabilities. In another example, UAV platform 230 may determine that the flight path and/or the mission operations require UAVs 220 that are capable of sensing radiation along the flight path. In such an example, UAV platform 230 may determine that UAVs 220 without a radiation sensor do not satisfy the required UAV capabilities, but that UAVs 220 with a radiation sensor satisfy the required UAV capabilities.

In some implementations, UAV platform 230 may determine the required UAV capabilities based on the aviation information associated with the particular region, such as the weather information, the air traffic information, the obstacle information, the regulatory information, the historical information, etc. associated with the particular region. For example, assume that the weather information indicates that the flight path requires traveling through a particular headwind of twenty kilometers per hour. In such an example, UAV platform 230 may determine that the flight path requires UAVs 220 that are capable of withstanding the particular headwind. In another example, assume that the air traffic information indicates that the flight path requires traveling at a particular altitude of one kilometer to avoid other air traffic. In such an example, UAV platform 230 may determine that the flight path requires UAVs 220 that are capable of traveling at the particular altitude.

As further shown in FIG. 4A, process 400 may include identifying UAVs, from the pool of UAVs, based on the required UAV capabilities (block 420). For example, UAV platform 230 may identify UAVs 220, from the pool of UAVs 220, based on the required UAV capabilities. In some implementations, UAV platform 230 may identify UAVs 220, from UAVs 220 in the pool, when the identified UAVs 220 are capable of performing the mission operations, and flying a distance associated with the flight path, in weather conditions (e.g., specified by the weather information), without colliding with air traffic and/or obstacles (e.g., specified by the air traffic information and the obstacle information), and without violating any regulations (e.g., specified by the regulatory information). In some implementations, UAV platform 230 may identify multiple UAVs 220, from UAVs 220 in the pool, that satisfy the required UAV capabilities, and may select, as the identified UAVs 220, ones of the multiple UAVs 220 that are capable of traversing the flight path and performing the mission operations in the most efficient manner (e.g., in a shortest distance, in a shortest amount of time, using the least amount of resources, etc.).

In some implementations, UAV platform 230 may retrieve, from data storage 235, capability information for UAVs 220 in the pool. In some implementations, data storage 235 may include capability information associated with different components of UAVs 220, such as battery life, thrusts provided by rotors, flight times associated with amounts of fuel, etc. In some implementations, UAV platform 230 may utilize component information of UAVs 220 in the pool (e.g., indicating that UAVs 220 in the pool have particular types of batteries, engines, rotors, etc.) to retrieve the capability information for components of UAVs 220 in the pool from data storage 235. For example, if a particular UAV 220 in the pool has a particular type of battery and a particular type of rotor, UAV platform 230 may determine that the particular type of battery of the particular UAV 220 may provide two hours of flight time and that the particular type of rotor may enable the particular UAV 220 to reach an altitude of one-thousand meters.

In some implementations, UAV platform 230 may assign different weights to different capability information associated with UAVs 220 in the pool. In some implementations, UAV platform 230 may calculate a score for each of UAVs 220 in the pool based on the capability information and the assigned weights. For example, assume that UAV platform 230 assigns a weight of 0.1 to battery lives of UAVs 220 in the pool, a weight of 0.2 to rotor thrusts of UAVs 220 in the pool, and a weight of 0.5 to the sense and avoid capabilities of UAVs 220 in the pool. Further, assume that UAV platform 230 calculates a score of 0.4 for a first UAV 220 in the pool, a score of 0.7 for a second UAV 220 in the pool, and a score of 0.5 for a third UAV 220 in the pool. In some implementations, UAV platform 230 may identify UAVs 220 in the pool based on the required UAV capabilities and/or the calculated scores. For example, UAV platform 220 may identify UAVs 220 in the pool with the greatest scores or the smallest scores.

As further shown in FIG. 4A, process 400 may include generating flight path instructions for the flight path, and mission instructions for the mission operations (block 425). For example, UAV platform 230 may generate flight path instructions for the flight path, and may generate mission instructions for the mission operations. In some implementations, the flight path instructions may include specific altitudes for the identified UAVs 220 between fixed geographic coordinates (e.g., a first location and a second location); navigational information (e.g., travel east for three kilometers, then north for two kilometers, etc.); expected weather conditions (e.g., headwinds, tailwinds, temperatures, etc.); network information (e.g., locations of base stations of wireless network 240); timing information (e.g., when to take off, when to perform certain navigational maneuvers, etc.); waypoint information (e.g., locations where the identified UAVs 220 may stop and recharge or refuel); etc. For example, the flight path instructions may include information that instructs the identified UAVs 220 to fly forty-five degrees northeast for ten kilometers and at an altitude of five-hundred meters, then fly three-hundred and fifteen degrees northwest for ten kilometers and at an altitude of four-hundred meters, etc.

In some implementations, the mission instructions may include information instructing the identified UAVs 220 to perform certain operations along the flight path and/or at the destination location. For example, the mission instructions may include information instructing the identified UAVs 220 to capture video and/or images, measure radiation levels at different locations, measure temperature levels at the different locations, etc. In another example, the mission instructions may include information instructing the identified UAVs 220 to deliver packages (e.g., food, medicine, etc.) to a particular region (e.g., to survivors of a natural disaster than cannot be reached by emergency personnel).

As further shown in FIG. 4A, process 400 may include providing the flight path instructions and the mission instructions to the identified UAVs (block 430). For example, UAV platform 230 may provide the flight path instructions and the mission instructions to the identified UAVs 220. In some implementations, the identified UAVs 220 may utilize the flight path instructions to travel via the flight path. For example, the identified UAVs 220 may take off at a time specified by the flight path instructions, may travel a route and at altitudes specified by the flight path instructions, may detect and avoid any obstacles encountered in the flight path, etc. until the identified UAVs 220 arrives at the destination location.

In some implementations, UAV platform 230 may provide the entire mission instructions to each of the identified UAVs 220. For example, if the mission instructions specify capturing video and/or images, taking temperature measurements, and measuring wind conditions, UAV platform 230 may provide information associated with capturing video and/or images, taking temperature measurements, and measuring wind conditions to each of the identified UAVs 220. In some implementations, UAV platform 230 may provide a portion of the mission instructions to each of the identified UAVs 220. For example, UAV platform 230 may provide information associated with capturing video and/or images to a first UAV 220 of the identified UAVs 220, may provide information associated with taking temperature measurements to a second UAV 220 of the identified UAVs 220, and may provide information associated with measuring wind conditions to a third UAV 220 of the identified UAVs 220.

In some implementations, the mission instructions may instruct multiple UAVs 220, of the identified UAVs 220, to perform the same task simultaneously. For example, the mission instructions may instruct four UAVs 220 to simultaneously measure temperature levels at different locations of a nuclear reactor, in order to determine temperature gradients associated with the nuclear reactor. Such information may enable emergency personnel determine whether the nuclear reactor is dangerously close to a meltdown. In another example, the mission instructions may instruct three UAVs 220 to simultaneously measure wind speed and direction at different locations of a forest fire, in order to determine wind conditions associated with the forest fire. Such information may help firefighters determine a direction that the forest fire may spread.

In some implementations, if the identified UAVs 220 include sufficient computational resources (e.g., a sufficient degree of autonomy), the identified UAVs 220 may utilize information provided by the flight path instructions and/or the mission instructions to calculate a flight path for the identified UAVs 220 and to generate flight path instructions and/or mission instructions. In such implementations, the flight path instructions and/or the mission instructions provided by UAV platform 230 may include less detailed information, and the identified UAVs 220 may determine more detailed flight path instructions and/or mission instructions via the computational resources of the identified UAVs 220.

As shown in FIG. 4B, process 400 may include receiving mission information from the identified UAVs (block 435). For example, when the identified UAVs 220 are located at the destination location, the identified UAVs 220 may provide mission information to UAV platform 230, via one or more of networks 240-260, and UAV platform 230 may receive the mission information. In some implementations, UAV platform 230 may provide the mission information to user device 210 that provided the request to UAV platform 230. In some implementations, the mission information may include information received by sensors of the identified UAVs 220, such as visual information received from electromagnetic spectrum sensors of the identified UAVs 220 (e.g., images of obstacles, a natural disaster, infrared images, images the show objects radiating heat, etc.), temperature information, wind conditions, radiation levels, etc. In some implementations, the identified UAVs 220 may utilize such mission information to detect and avoid any unexpected obstacles encountered by the identified UAVs 220 during traversal of the flight path and/or performance of the mission operations. For example, if a particular UAV 220 of the identified UAVs 220 detects another UAV 220 in the flight path, the particular UAV 220 may alter the flight path to avoid colliding with the other UAV 220.

In some implementations, the identified UAVs 220 may utilize the mission information to coordinate performance of the mission operations. In such implementations, the identified UAVs 220 may communicate with each other so that the identified UAVs 220 may coordinate performance of the mission operations. For example, if the mission requires two UAVs 220 of the identified UAVs 220 to simultaneously capture images of different locations of the destination location, the two UAVs 220 may communicate with each other so that the two UAVs 220 may know when the two UAVs 220 are positioned to simultaneously capture the images of the different locations.

In some implementations, while the identified UAVs 220 are traveling along the flight path in accordance with the flight path instructions, the identified UAVs 220 may provide mission information to UAV platform 230, via one or more of networks 240-260, and UAV platform 230 may receive the mission information. In such implementations, the mission information may include information received by sensors of the identified UAVs 220 during traversal of the flight path, such as visual information received from electromagnetic spectrum sensors of the identified UAVs 220, temperature information, radiation information, wind conditions, etc.

As further shown in FIG. 4B, process 400 may include determining whether the identified UAVs are experiencing problem(s) with performance of the mission operations (block 440). For example, UAV platform 230 may determine whether any of the identified UAVs 220 are experiencing problems with performance of the mission operations, based on the mission information received from the identified UAVs 220. In some implementations, UAV platform 230 may determine that one or more of the identified UAVs 220 are experiencing problems with the performance of the mission operations when the mission information indicates that one or more of the identified UAVs 220 are damaged (e.g., rotors are damaged); running out of battery power; have damaged sensors (e.g., and cannot perform a measurement); etc. For example, UAV platform 230 may determine that a particular UAV 220 of the identified UAVs 220 is experiencing problems when the mission information indicates that the particular UAV 220 is damaged and cannot perform a measurement (e.g., of radiation levels, temperature levels, etc.).

In some implementations, UAV platform 230 may determine that one or more of the identified UAVs 220 are experiencing problems with the performance of the mission operations when the mission information indicates that the one or more UAVs 220 are in danger of colliding with an obstacle (e.g., another UAV 220, a building, an airplane, etc.). In such implementations, UAV platform 230 may modify the flight path so that the one or more UAVs 220 avoid colliding with the obstacle and/or remains a safe distance from the obstacle. In some implementations, UAV platform 230 may determine that one or more of the identified UAVs 220 are experiencing problems with the performance of the mission operations when the mission information indicates that the weather conditions may prevent the one or more UAVs 220 from reaching or staying at the destination location. For example, the wind conditions may change and cause the flight time of the one or more UAVs 220 to increase to a point where the batteries of the one or more UAVs 220 will be depleted before the one or more UAVs 220 reach the destination location. In such an example, UAV platform 230 may modify the flight path so that the one or more UAVs 220 either stop to recharge or change altitude to improve wind conditions.

In some implementations, UAV platform 230 may determine that the identified UAVs 220 are not experiencing problems with the performance of the mission operations when the mission information indicates that the identified UAVs 220 are performing the mission (e.g., travelling the flight path, capturing images, taking measurements, etc.) in accordance with the flight path instructions and/or the mission instructions. In such implementations, UAV platform 230 may continue to monitor the performance of the mission operations by the identified UAVs 220.

As further shown in FIG. 4B, if the identified UAVs are experiencing problem(s) with performance of the mission operations (block 440—YES), process 400 may include identifying a problem with a particular UAV of the identified UAVs (block 445). For example, if UAV platform 230 determines that one or more of the identified UAVs 220 are experiencing problems with the performance of the mission operations, UAV platform 230 may identify a problem with a particular UAV 220 of the identified UAVs 220. In some implementations, UAV platform 230 may determine that a particular UAV 220 of the identified UAVs 220 is experiencing problems when the mission information indicates that the particular UAV 220 is damaged and cannot perform a measurement (e.g., of radiation levels, temperature levels, etc.); is running low on battery power; is damaged and cannot complete the flight path; etc.

As further shown in FIG. 4B, process 400 may include instructing one of the identified UAVs to perform operation(s) of the particular UAV (block 450). For example, UAV platform 230 may instruct one of the identified UAVs 220 (e.g., other than the particular UAV 220) to perform the operation(s) of the particular UAV 220. In some implementations, UAV platform 230 may determine an operation to be performed by the particular UAV 220 for the mission, and may select one of the identified UAVs 220 that is capable of performing the operation. In such implementations, UAV platform 230 may instruct the selected UAV 220 to perform the operation in place of the particular UAV 220. For example, assume that the particular UAV 220 is to measure temperature levels of a forest fire, but that the temperature sensor of the particular UAV 220 is not functioning. In such an example, UAV platform 230 may select one of the identified UAVs 220 with a temperature sensor, and may instruct the selected UAV 220 to measure the temperature levels of the forest fire.

In some implementations, the identified UAVs 220 may determine that a particular UAV 220 of the identified UAVs 220 is experiencing problems based on communication of the mission information between the identified UAVs 220. In such implementations, one of the identified UAVs 220 (e.g., other than the particular UAV 220) may automatically perform the operation(s) of the particular UAV 220, without the identified UAVs 220 receiving instructions from UAV platform 230. For example, assume that the particular UAV 220 is to measure radiation levels of a nuclear reactor, but that the radiation sensor of the particular UAV 220 is not functioning. In such an example, one of the identified UAVs 220 with a radiation sensor may measure the radiation levels of the nuclear reactor in place of the particular UAV 220.

As further shown in FIG. 4B, if the identified UAVs are not experiencing problem(s) with performance of the mission operations (block 440—NO) or after instructing one of the identified UAVs to perform operation(s) of the particular UAV (block 450), process 400 may include receiving a notification that the mission is completed by the identified UAVs (block 455). For example, if UAV platform 230 determines that the identified UAVs 220 are not experiencing problems with the performance of the mission operations or after UAV platform 230 instructs one of the identified UAVs 220 (e.g., other than the particular UAV 220) to perform the operation(s) of the particular UAV 220, the identified UAVs 220 may continue to perform the mission operations until the mission is complete. When the identified UAVs 220 have completed the mission, one or more of the identified UAVs 220 may provide a notification to UAV platform 230, via one or more of networks 240-260. In some implementations, the notification may indicate that the identified UAVs 220 have completed the mission.

Although FIGS. 4A and 4B shows example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5A:
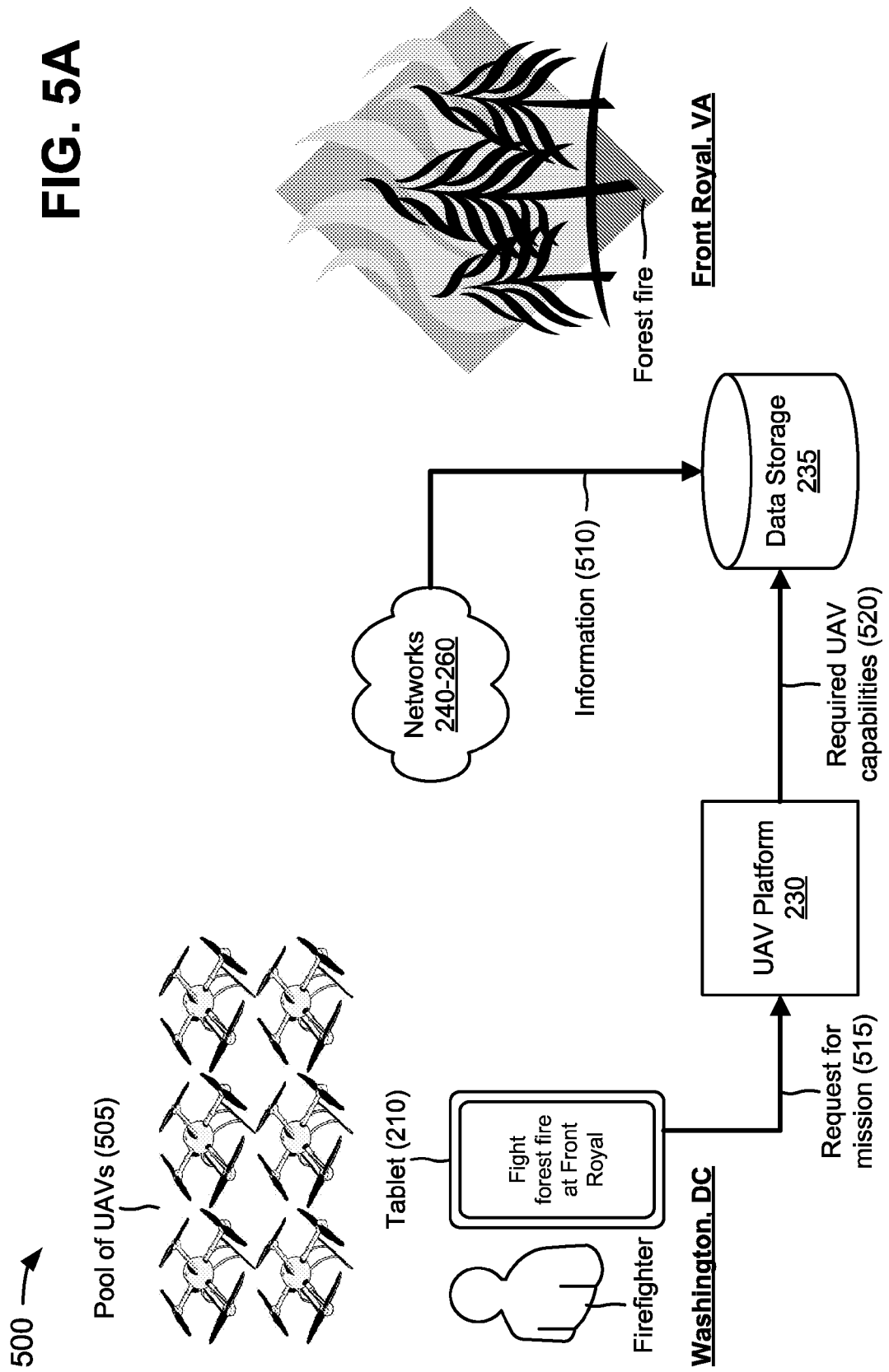
Figure 5B:
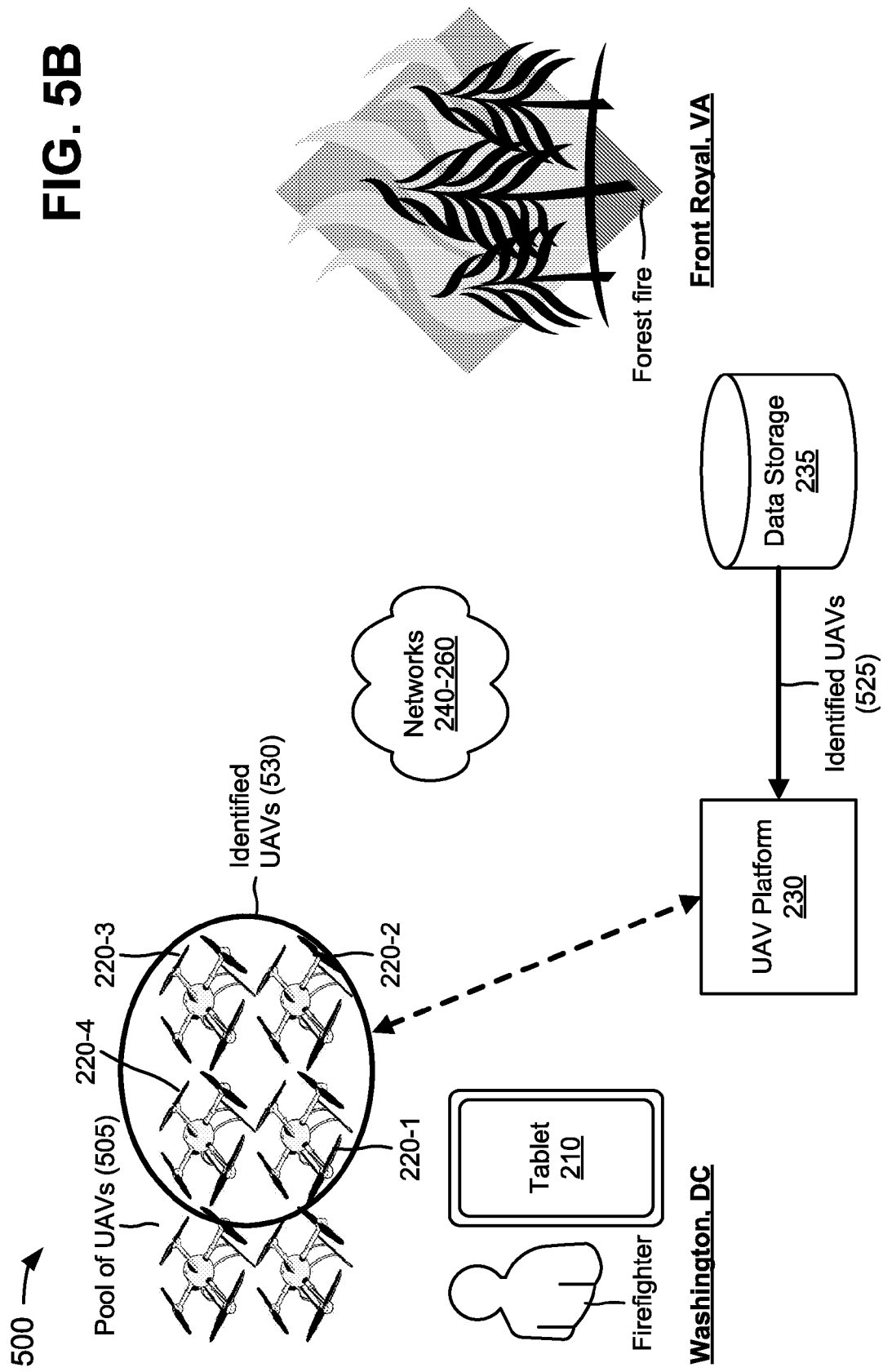

FIGS. 5A-5E are diagrams of an example 500 relating to example process 400 shown in FIGS. 4A and 4B. Assume that user device 210 (e.g., a tablet 210) is associated with a user (e.g., a firefighter) that is located at an origination location (e.g., Washington, D.C.), as shown in FIG. 5A. Further, assume that a forest fire is occurring at a destination location (e.g., Front Royal, Va.), and that the forest fire is unsafe for firefighters to approach. Therefore, assume that the firefighter wants to utilize multiple UAVs 220, from a pool 505 of UAVs 220, to fly from Washington, D.C. to Front Royal, Va. in order to capture video and images of the forest fire, measure wind conditions at the forest fire, and measure temperature conditions of the forest fire.

As further shown in FIG. 5A, UAV platform 230 and data storage 235 may communicate with wireless network 240, satellite network 250, and/or other networks 260. One or more of networks 240-260 may provide, to data storage 235, information 510, such as capability information associated with UAVs 220 in pool 505, weather information associated with a geographical region (e.g., that includes a geographical location of Washington, D.C., a geographical location of Front Royal, Va., and geographical locations between Washington and Front Royal), air traffic information associated with the geographical region, obstacle information associated with the geographical region, regulatory information associated with the geographical region, historical information associated with the geographical region, etc.

As further shown in FIG. 5A, the firefighter may instruct tablet 210 to generate a request 515 for a mission (e.g., for UAVs 220 in pool 505) that includes travelling a flight path (e.g., from Washington, D.C. to Front Royal, Va.) and performing a mission (e.g., capture video/images and measure temperatures and wind conditions of forest fire) at Front Royal, Va. The firefighter may also instruct tablet 210 to provide request 515 to UAV platform 230. Request 515 may include credentials (e.g., serial numbers, identifiers of UICCs, etc.) associated with UAVs 220 in pool 505, or the credentials may be provided separately from request 515 to UAV platform 230. UAV platform 230 may utilize the credentials to determine whether one or more UAVs 220 in pool 505 are authenticated for utilizing UAV platform 230 and/or one or more of networks 240-260, and are registered with an appropriate authority for use. For example, UAV platform 230 may compare the credentials with information provided in data storage 235 in order to determine whether one or more UAVs 220 in pool 505 are authenticated for utilizing UAV platform 230 and/or one or more of networks 240-260, and are registered with an appropriate authority. Assume that all UAVs 220 in pool 505 are authenticated and/or registered.

UAV platform 230 may calculate a flight path from Washington, D.C. to Front Royal, Va. based on information 510 (e.g., weather information, air traffic information, obstacle information, regulatory information, historical information, etc.) provided in data storage 235. For example, assume that the weather information indicates that the wind is ten kilometers per hour from the west and that it is raining; the air traffic information indicates that a jet is at an altitude of ten-thousand meters and another UAV 220 is at an altitude of five-hundred meters; the obstacle information indicates that a mountain is two kilometers in height and a building is five-hundred meters in height; the regulatory information indicates that there is a no-fly zone over a government building; and the historical information indicates that a historical flight path had a duration of thirty minutes and an altitude of one-thousand meters. UAV platform 230 may calculate the flight path from Washington, D.C. to Front Royal, Va. based on such information.

As further shown in FIG. 5A, UAV platform 230 may determine required UAV capabilities 520 for the requested mission based on request 515. For example, UAV platform 230 may determine that required UAV capabilities 520 include flying from Washington, D.C. to Front Royal, Va. non-stop, capturing video/images of the forest fire, measuring wind conditions at the forest fire, and measuring temperature conditions of the forest fire. UAV platform 230 may provide required UAV capabilities 520 to data storage 235 (e.g., for storage).

UAV platform 230 may assign different weights to different capability information associated with UAVs 220 in pool 505, and may calculate a score for each UAV 220 in pool 505 based on the assigned weights. UAV platform 230 may identify UAVs 220, from UAVs 220 in pool 505, based on the scores and/or based on required UAV capabilities 520, as indicated by reference number 525 in FIG. 5B. UAVs 220 identified by UAV platform 230 may include four UAVs 220 (e.g., UAV 220-1, UAV 220-2, UAV 220-3, and UAV 220-4), and may be referred to collectively as "identified UAVs 530" in FIG. 5B. Identified UAVs 530 may be capable of flying from Washington, D.C. to Front Royal, Va. non-stop, capturing video/images of the forest fire, measuring wind conditions at the forest fire, and measuring temperature conditions of the forest fire.

The calculated flight path from Washington, D.C. to Front Royal, Va. is depicted by reference number 535 in FIG. 5C. As further shown in FIG. 5C, UAV platform 230 may generate flight path/mission instructions 540 for flight path 535. Flight path/mission instructions 540 may include, for example, information instructing identified UAVs 530 to fly north at zero degrees for ten kilometers, then northeast at forty degrees for three kilometers, at an altitude of one-thousand meters, capture video/images of the forest fire, measure wind conditions at the forest fire, measure temperature conditions of the forest fire etc. UAV platform 230 may provide flight path/mission instructions 540 to identified UAVs 530 via one or more of networks 240-260. Identified UAVs 530 may take off from Washington, D.C., and may travel flight path 535 based on flight path/mission instructions 540.

When identified UAVs 530 arrive at the forest fire in Front Royal, Va., identified UAVs 530 may perform the mission operations. For example, UAVs 220-1 and 220-2 may capture video/images of the forest fire, UAV 220-3 may measure wind conditions at the forest fire, and UAV 220-4 may measure temperature conditions of the forest fire. However, as shown in FIG. 5D, UAV 220-1 may experience a problem 545 (e.g., a camera of UAV 220-1 is inoperable), and may provide information about problem 545 to UAV platform 230. UAV platform 230 may determine instructions for problem 545, and may provide the instructions for problem 545 to UAV 220-2, as indicated by reference number 550 in FIG. 5D. The instructions for problem 545 may instruct UAV 220-2 to capture video/images of the forest fire that were to be captured by UAV 220-1.

As shown in FIG. 5E, UAV 220-2 may perform the mission operations assigned to UAV 220-1 (e.g., capturing video/images of the forest fire) and the mission operations assigned to UAV 220-2. UAV 220-1 may return to Washington, D.C., via a return flight path 555, as further shown in FIG. 5E. While UAVs 220-2, 220-3, and 220-4 are performing the mission operations at the forest fire, UAVs 220-2, 220-3, and 220-4 may communicate 560 with each other. For example, UAVs 220-2, 220-3, and 220-4 may share information about mission operations being performed, measurement information, etc. While UAVs 220-2, 220-3, and 220-4 are performing the mission operations at the forest fire, UAVs 220-2, 220-3, and 220-4 may provide mission information 565 to UAV platform 230 (e.g., via one or more of networks 240-260). Mission information 565 may include captured video/images of the forest fire, measured wind conditions at the forest fire, and measured temperature conditions of the forest fire. UAV platform 230 may provide mission information 565 to tablet 210 (e.g., for display to the firefighter). When UAVs 220-2, 220-3, and 220-4 have completed the mission, one or more of UAVs 220-2, 220-3, and 220-4 may provide a mission completed notification 570 to UAV platform 230, via one or more of networks 240-260. Mission completed notification 570 may indicate that UAVs 220-2, 220-3, and 220-4 have completed the mission. UAV platform 230 may provide notification 570 to table 210 (e.g., for display to the firefighter).

As indicated above, FIGS. 5A-5E are provided merely as an example. Other examples are possible and may differ from what was described with regard to FIGS. 5A-5E.

Systems and/or methods described herein may provide a platform that enables UAVs to safely traverse flight paths from origination locations to destination locations. The systems and/or methods may enable UAVs to perform missions that may be too dangerous for humans to perform. The systems and/or methods may enable selection of UAVs most capable of collecting different types of information for a mission, which may increase efficiencies of the UAVs and reduce costs associated with the UAVs.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  receiving, by a device, capability information for one or more unmanned aerial vehicles;
  assigning, by the device, one or more weights to the capability information;
  identifying, by the device, the one or more unmanned aerial vehicles based on the one or more weights;
  providing, by the device and based on identifying the one or more unmanned aerial vehicles, flight path instructions and mission instructions to the one or more unmanned aerial vehicles to permit the one or more unmanned aerial vehicles to travel from a first geographical location to a second geographical location, via a flight path, and to perform one or more mission operations;
  receiving, by the device and from the one or more unmanned aerial vehicles, mission information,
    the mission information indicating that a sensor of a first unmanned aerial vehicle, of the one or more unmanned aerial vehicles, is unable to perform a measurement;
  determining, by the device and based on receiving the mission information, a problem associated with the first unmanned aerial vehicle; and
  instructing, by the device and based on determining the problem, a second unmanned aerial vehicle of the one or more unmanned aerial vehicles to perform an operation of the first unmanned aerial vehicle.

2. The method of claim 1, further comprising:
  determining required capabilities for a mission based on at least one of:
    the first geographical location and the second geographical location;
    component requirements associated with the flight path and the one or more mission operations;
    physical requirements associated with the flight path and the one or more mission operations; or
    aviation information associated with the first geographical location and the second geographical location; and
  where identifying the one or more unmanned aerial vehicles comprises:
    identifying the one or more unmanned aerial vehicles based on determining the required capabilities for the mission.

3. The method of claim 1, further comprising:
  calculating a score, for each of the one or more unmanned aerial vehicles, based on assigning the one or more weights; and
  where identifying the one or more unmanned aerial vehicles comprises:
    identifying particular unmanned aerial vehicles, from the one or more unmanned aerial vehicles, based on the calculated score and based on required capabilities for a mission.

4. The method of claim 1, further comprising:
  instructing the first unmanned aerial vehicle to return to the first geographical location.

5. The method of claim 1, further comprising:
  determining one or more waypoints along the flight path for recharging or refueling the one or more unmanned aerial vehicles.

6. The method of claim 1, further comprising:
  generating the flight path instructions for the flight path and the mission instructions for the one or more mission operations.

7. The method of claim 1, further comprising:
  identifying at least one prior flight path from the first geographical location to the second geographical location; and
  selecting one of the at least one prior flight path as the flight path.

8. A system, comprising:
  one or more devices to:
    receive capability information for one or more unmanned aerial vehicles;
    assign one or more weights to the capability information;
    identify the one or more unmanned aerial vehicles based on the one or more weights;
    provide, based on identifying the one or more unmanned aerial vehicles, flight path instructions and mission instructions to the one or more unmanned aerial vehicles to permit the one or more unmanned aerial vehicles to travel from a first geographical location to a second geographical location, via a flight path, and to perform one or more mission operations at the second geographical location;
    receive, from the one or more unmanned aerial vehicles, mission information,
      the mission information indicating that a sensor of a first unmanned aerial vehicle, of the one or more unmanned aerial vehicles, being unable to perform a function;
    determine, based on receiving the mission information, a problem associated with the first unmanned aerial vehicle; and
    instruct a second unmanned aerial vehicles to perform a mission operation of the first unmanned aerial vehicle.

9. The system of claim 8, where the one or more devices are further to:

determine required capabilities for a mission based on at least one of:
the first geographical location and the second geographical location;
component requirements associated with the flight path and the one or more mission operations;
physical requirements associated with the flight path and the one or more mission operations; or
aviation information associated with the first geographical location and the second geographical location; and
where the one or more devices, when identifying the one or more unmanned aerial vehicles, are to:
identify the one or more unmanned aerial vehicles based on determining the required capabilities for the mission.

10. The system of claim 8, where the one or more devices are further to:
calculate a score, for each of the one or more unmanned aerial vehicles, based on assigning the one or more weights; and
where the one or more devices, when identifying the one or more unmanned aerial vehicles, are to:
identify particular unmanned aerial vehicles, from the one or more unmanned aerial vehicles, based on the calculated score and based on required capabilities for a mission.

11. The system of claim 8, where the one or more devices are further to:
instruct the first unmanned aerial vehicle to return to the first geographical location.

12. The system of claim 8, where the one or more devices are further to:
receive, from the one or more unmanned aerial vehicles, a notification indicating that a mission is complete when the one or more unmanned aerial vehicles complete the one or more mission operations.

13. The system of claim 8, where the one or more unmanned aerial vehicles perform the one or more mission operations while traversing the flight path and at the second geographical location.

14. The system of claim 8, where the one or more devices are further to:
calculating the flight path based on at least one or more of:
weather information,
air traffic information,
regulatory information,
obstacle information, or
historical information.

15. A non-transitory computer-readable medium for storing instructions, the instructions comprising:
one or more instructions that, when executed by one or more processors of a device, cause the one or more processors to:
receive capability information for one or more unmanned aerial vehicles;
assign one or more weights to the capability information;
identify the one or more unmanned aerial vehicles based on the one or more weights;
generate flight path instructions for a flight path and mission instructions for one or more mission operations;
provide, based on identifying the one or more unmanned aerial vehicles, the flight path instructions and the mission instructions to the one or more unmanned aerial vehicles to permit the one or more unmanned aerial vehicles to travel from a first geographical location to a second geographical location, via the flight path, and to perform the one or more mission operations at the second geographical location;
receive, from the one or more unmanned aerial vehicles, mission information,
the mission information indicating that a sensor of a first unmanned aerial vehicle, of the one or more unmanned aerial vehicles, being unable to perform a function;
determine, based on receiving the mission information, a problem associated with the first unmanned aerial vehicle; and
instruct a second unmanned aerial vehicle, of the one or more unmanned aerial vehicles, to perform a mission operation of the first unmanned aerial vehicle.

16. The non-transitory computer-readable medium of claim 15, where the instructions further comprise:
one or more instructions that, when executed by the one or more processors, cause the one or more processors to:
determine required capabilities for a mission based on at least one of:
the first geographical location and the second geographical location;
component requirements associated with the flight path and the one or more mission operations;
physical requirements associated with the flight path and the one or more mission operations; or
aviation information associated with the first geographical location and the second geographical location; and
where the one or more instruction, that cause the one or more processors to identify the one or more unmanned aerial vehicles, cause the one or more processors to:
identify the one or more unmanned aerial vehicles based on determining the required capabilities for the mission.

17. The non-transitory computer-readable medium of claim 15, where the instructions further comprise:
one or more instructions that, when executed by the one or more processors, cause the one or more processors to:
calculate a score, for each of the one or more unmanned aerial vehicles, based on assigning the one or more weights; and
where the one or more instruction, that cause the one or more processors to identify the one or more unmanned aerial vehicles, cause the one or more processors to:
identify particular unmanned aerial vehicles, from the one or more unmanned aerial vehicles, based on the calculated score and based on required capabilities for a mission.

18. The non-transitory computer-readable medium of claim 15, where the instructions further comprise:
one or more instructions that, when executed by the one or more processors, cause the one or more processors to:
instruct the first unmanned aerial vehicle to return to the first geographical location.

19. The non-transitory computer-readable medium of claim 15, where the instructions further comprise:
one or more instructions that, when executed by the one or more processors, cause the one or more processors to:

receive, from at least one of the one or more unmanned aerial vehicles, a notification indicating that a mission is complete when the one or more unmanned aerial vehicles complete the one or more mission operations.

20. The non-transitory computer-readable medium of claim 15, where the instructions further comprise:
one or more instructions that, when executed by the one or more processors, cause the one or more processors to:
determine that the flight path includes a path over a restricted area; and
modify the flight path to avoid the restricted area based on determining that the flight path includes the path over the restricted area.

* * * * *